United States Patent
Moser et al.

(10) Patent No.: US 10,896,204 B2
(45) Date of Patent: *Jan. 19, 2021

(54) MULTIVARIATE INSIGHT DISCOVERY APPROACH

(71) Applicant: Business Objects Software Ltd., Dublin (IE)

(72) Inventors: Flavia Moser, Vancouver (CA); Alexander Kennedy MacAulay, Vancouver (CA); Julian Gosper, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 93 days.

This patent is subject to a terminal disclaimer.

(21) Appl. No.: 16/266,892

(22) Filed: Feb. 4, 2019

(65) Prior Publication Data

US 2019/0243844 A1 Aug. 8, 2019

Related U.S. Application Data

(63) Continuation of application No. 14/511,047, filed on Oct. 9, 2014, now Pat. No. 10,255,345.

(51) Int. Cl.
*G06F 16/28* (2019.01)
*G06F 16/25* (2019.01)
(Continued)

(52) U.S. Cl.
CPC ......... *G06F 16/283* (2019.01); *G06F 16/248* (2019.01); *G06F 16/254* (2019.01); *G06F 16/26* (2019.01); *G06T 11/206* (2013.01)

(58) Field of Classification Search
CPC ...... G06F 16/283; G06F 16/26; G06F 16/248; G06F 16/254
(Continued)

(56) References Cited

U.S. PATENT DOCUMENTS 5,978,788 A * 11/1999 Castelli ............... G06F 16/2462
6,301,579 B1 * 10/2001 Becker ................. G06F 16/283
(Continued)

OTHER PUBLICATIONS

"U.S. Appl. No. 14/511,047, Advisory Action dated Sep. 24, 2018", 3 pgs.
(Continued)

*Primary Examiner* — Mark E Hershley
(74) *Attorney, Agent, or Firm* — Schwegman Lundberg & Woessner, P.A.

(57) ABSTRACT

A raw dataset including measures and dimensions is processed, by a preprocessing module, using an algorithm that produces a preprocessed dataset such that at least one type of statistical analysis of the preprocessed dataset yields equal results to the same type of statistical analysis of the raw dataset. The preprocessed dataset is then analyzed by a statistical analysis module to identify subsets of the preprocessed dataset that include a non-random structure or pattern. The analysis of the preprocessed dataset includes the at least one type of statistical analysis that produces the same results for both the preprocessed and raw datasets. The identified subsets are then ranked by a statistical ranker based on the analysis of the preprocessed dataset and a subset is selected for visualization based on the rankings. A visualization module then generates a visualization of the selected identified subset that highlights a non-random structure of the selected subset.

20 Claims, 8 Drawing Sheets (51) Int. Cl.
  *G06F 16/26* (2019.01)
  *G06F 16/248* (2019.01)
  *G06T 11/20* (2006.01)

(58) Field of Classification Search
  USPC .......................................................... 707/602
  See application file for complete search history.

(56) References Cited

U.S. PATENT DOCUMENTS

| | | | | |
|---|---|---|---|---|
| 6,374,251 | B1* | 4/2002 | Fayyad | G06F 16/35 |
| 7,756,896 | B1* | 7/2010 | Feingold | G06Q 40/06 |
| | | | | 707/791 |
| 8,407,164 | B2* | 3/2013 | Malik | G06F 16/35 |
| | | | | 706/12 |
| 8,527,544 | B1* | 9/2013 | Colgrove | G06F 3/0608 |
| | | | | 707/791 |
| 8,655,756 | B2* | 2/2014 | Seubert | G06Q 30/04 |
| | | | | 705/35 |
| 8,935,247 | B1* | 1/2015 | Tholome | G06F 16/355 |
| | | | | 707/736 |
| 8,943,039 | B1* | 1/2015 | Grieselhuber | G06F 16/958 |
| | | | | 707/709 |
| 8,972,379 | B1* | 3/2015 | Grieselhuber | G06F 16/958 |
| | | | | 707/713 |
| 9,021,448 | B1* | 4/2015 | Gagliardi | G06F 11/3636 |
| | | | | 717/130 |
| 2002/0010691 | A1* | 1/2002 | Chen | G06K 9/6278 |
| | | | | 706/20 |
| 2002/0124001 | A1* | 9/2002 | Chaudhuri | G06F 16/2462 |
| 2002/0198919 | A1* | 12/2002 | Kelkar | G06Q 10/04 |
| | | | | 718/100 |
| 2003/0014417 | A1* | 1/2003 | Kelkar | G06F 16/2465 |
| 2003/0028546 | A1* | 2/2003 | Keller | G06F 16/283 |
| 2003/0171876 | A1* | 9/2003 | Markowitz | G16B 50/00 |
| | | | | 702/20 |
| 2003/0204499 | A1* | 10/2003 | Shahabi | G06F 16/2462 |
| 2004/0139067 | A1* | 7/2004 | Houle | G06F 16/35 |
| 2005/0160423 | A1* | 7/2005 | Bantz | G06F 11/3495 |
| | | | | 718/1 |
| 2005/0182773 | A1* | 8/2005 | Feinsmith | G06Q 10/10 |
| 2005/0187741 | A1* | 8/2005 | Gilbert | A63F 13/57 |
| | | | | 703/2 |
| 2005/0187972 | A1* | 8/2005 | Kruger | G06Q 30/0204 |
| 2006/0063156 | A1* | 3/2006 | Willman | A61P 35/02 |
| | | | | 435/6.14 |
| 2006/0085463 | A1* | 4/2006 | Chaudhuri | G06F 16/2462 |
| 2006/0265258 | A1* | 11/2006 | Powell | G06Q 30/02 |
| | | | | 705/327 |
| 2007/0087756 | A1* | 4/2007 | Hoffberg | G06Q 10/0635 |
| | | | | 455/450 |
| 2007/0203902 | A1* | 8/2007 | Bauerle | G06F 16/40 |
| 2007/0269804 | A1* | 11/2007 | Liew | G16B 40/00 |
| | | | | 435/6.11 |
| 2008/0005110 | A1* | 1/2008 | Tsuda | G05B 23/0221 |
| 2008/0120129 | A1* | 5/2008 | Seubert | G06Q 10/10 |
| | | | | 705/35 |
| 2008/0140320 | A1* | 6/2008 | Stephens | G16B 40/00 |
| | | | | 702/20 |
| 2008/0270369 | A1* | 10/2008 | Myerson | G06F 16/254 |
| 2008/0270469 | A1* | 10/2008 | Myerson | G06F 11/3409 |
| 2008/0288889 | A1* | 11/2008 | Hunt | G06Q 30/02 |
| | | | | 715/810 |
| 2009/0006156 | A1* | 1/2009 | Hunt | G06Q 30/02 |
| | | | | 705/7.11 |
| 2009/0006370 | A1* | 1/2009 | Li | G06F 16/24547 |
| 2009/0018996 | A1* | 1/2009 | Hunt | G06F 16/2264 |
| 2009/0254572 | A1* | 10/2009 | Redlich | G06Q 10/06 |
| 2009/0259679 | A1* | 10/2009 | Thiesson | G06F 16/904 |
| 2010/0205541 | A1* | 8/2010 | Rapaport | G06F 16/285 |
| | | | | 715/753 |
| 2010/0287146 | A1* | 11/2010 | Skelton | G06F 16/2453 |
| | | | | 707/705 |
| 2012/0278321 | A1* | 11/2012 | Traub | G06F 16/3331 |
| | | | | 707/736 |
| 2012/0303410 | A1* | 11/2012 | Connors | G06Q 30/02 |
| | | | | 705/7.31 |
| 2013/0086006 | A1* | 4/2013 | Colgrove | G06F 16/1752 |
| | | | | 707/692 |
| 2013/0097380 | A1* | 4/2013 | Colgrove | G06F 3/0641 |
| | | | | 711/118 |
| 2013/0156305 | A1* | 6/2013 | Prasad | G06T 7/11 |
| | | | | 382/164 |
| 2014/0058801 | A1* | 2/2014 | Deodhar | G06Q 10/0639 |
| | | | | 705/7.38 |
| 2014/0229498 | A1* | 8/2014 | Dillon | G06Q 30/0631 |
| | | | | 707/767 |
| 2014/0330827 | A1* | 11/2014 | Wu | G06F 16/285 |
| | | | | 707/737 |
| 2015/0213098 | A1* | 7/2015 | Ansari | G06F 16/25 |
| | | | | 707/600 |
| 2015/0317374 | A1* | 11/2015 | Petitclerc | G06Q 10/0639 |
| | | | | 707/603 |
| 2016/0085835 | A1* | 3/2016 | Wong | G06F 16/248 |
| | | | | 707/602 |
| 2016/0103902 | A1 | 4/2016 | Moser et al. | |

OTHER PUBLICATIONS

"U.S. Appl. No. 14/511,047, Examiner Interview Summary dated Jun. 26, 2017", 3 pgs.
"U.S. Appl. No. 14/511,047, Examiner Interview Summary dated Oct. 1, 2018", 3 pgs.
"U.S. Appl. No. 14/511,047, Final Office Action dated Aug. 6, 2018", 18 pgs.
"U.S. Appl. No. 14/511,047, Final Office Action dated Nov. 3, 2017", 20 pgs.
"U.S. Appl. No. 14/511,047, Non Final Office Action dated Jan. 24, 2018", 20 pgs.
"U.S. Appl. No. 14/511,047, Non Final Office Action dated Apr. 6, 2017", 16 pgs.
"U.S. Appl. No. 14/511,047, Notice of Allowance dated Nov. 14, 2018", 11 pgs.
"U.S. Appl. No. 14/511,047, PTO Response to Rule 312 Communication dated Jan. 31, 2019", 2 pgs.
"U.S. Appl. No. 14/511,047, Response Filed Apr. 17, 2018 to Non Final Office Action dated Jan. 24, 2018", 17 pgs.
"U.S. Appl. No. 14/511,047, Response filed Jun. 22, 2017 to Non Final Office Action dated Apr. 6, 2017", 16 pgs.
"U.S. Appl. No. 14/511,047, Response Filed Sep. 26, 2018 to Final Office Action dated Aug. 6, 2018", 15 pgs.
"U.S. Appl. No. 14/511,047, Response filed Dec. 29, 2017 to Final Office Action dated Nov. 3, 2017", 16 pgs.
"European Application Serial No. 14004373.8, Extended Search Report dated Feb. 25, 2015", 7 pgs.
"European Application Serial No. 14004373.8, Office Action dated Feb. 9, 2017", 10 pgs.
"European Application Serial No. 14004373.8, Response filed Sep. 19, 2016", 9 pgs.

* cited by examiner

MULTIVARIATE INSIGHT DISCOVERY APPROACH

TECHNICAL FIELD

This patent document relates generally to data analysis and visualization, and more particularly, but not by way of limitation, to systems and methods for automatically identifying subsets of a dataset that are used to produce insightful visualizations for a user who may have little or no experience with the particular dataset.

BACKGROUND

In a typical business environment a user may be presented with reports including data relating to subjects or fields that the user may not be familiar with. A user who is not an expert in the relevant area of a report may be overwhelmed when it comes to discerning interesting relationships from the data of the report. Furthermore, the user may desire an "insightful" visualization of the report data, for example a visualization that presents the subsets of data that exhibit a non-random and/or non-intuitive structure to the user in a form that is clear and visually appealing.

BRIEF DESCRIPTION OF THE DRAWINGS

Some embodiments are illustrated by way of example and not limitation in the figures of the accompanying drawings in which.

DETAILED DESCRIPTION

In example embodiments, the following terms may include the meanings as shown below.

OLAP—Online Analytical Processing includes a field of study that seeks to answer multi-dimensional analytic queries swiftly.

Dataset—includes a collection of data, usually in a table form. The table has m rows and n columns, where each column is a variable in the data collection, and each row is a member of the dataset across all columns.

Column—includes a variable in a dataset, consisting of a list of values from the dataset.

Attribute—includes a column in a dataset, used interchangeably with "dimension" in this document.

Measure—includes a numerical column in a dataset, often used in aggregational calculations over dimensions.

Dimension—includes a categorical column in a dataset, often used as an aggregator for numerical columns in the dataset called measures.

Cube—includes a dataset with at least one dimension and at least one measure used for data analysis.

OLAP cube—includes a multidimensional database that is optimized for data warehouse and online analytical processing (OLAP) applications. In OLAP cubes, data (measures) are categorized by dimensions. OLAP cubes are often pre-summarized across dimensions to drastically improve query time over relational databases.

Example systems and methods are described for enabling insightful visualizations of datasets even when, for example, a user is unfamiliar with the subject matter of the dataset. Also described by way of example are systems and methods for discovering non-random patterns or structures in subsets of the dataset. In some example embodiments, the systems and methods for enabling insightful visualization of datasets include processing raw data including dimensions and measures by aggregating over attributes of the raw data, among other things. In the following description, for purposes of explanation, numerous specific details are set forth in order to provide a thorough understanding of example embodiments. It will be evident, however, to one skilled in the art, that the disclosed systems and methods may be practiced without these specific details. It will also be evident that insightful visualization of datasets is not limited to the examples provided and may include other scenarios not specifically discussed.

In order to overcome the limitations of working with datasets a user is unfamiliar with, a system may adopt a preprocessing strategy that may create a preprocessed dataset that has the same relevant statistical properties as the raw data of the dataset. For example, the raw data may be sampled, projected or aggregated; or non-useful or duplicative data of the raw data may be discarded. The preprocessed dataset may then be analyzed to identify subsets of relevant data (e.g., columns) that contain insightful information, and after these subsets have been identified they may then be ranked or sorted to determine which are the most insightful or useful to a user. Still further, the system may determine how to visualize the results of the statistical analysis for a selected subset in a way that highlights its determinations, for example by highlighting any non-random structures or patterns in the data.

Example Visualization

Figure 1:
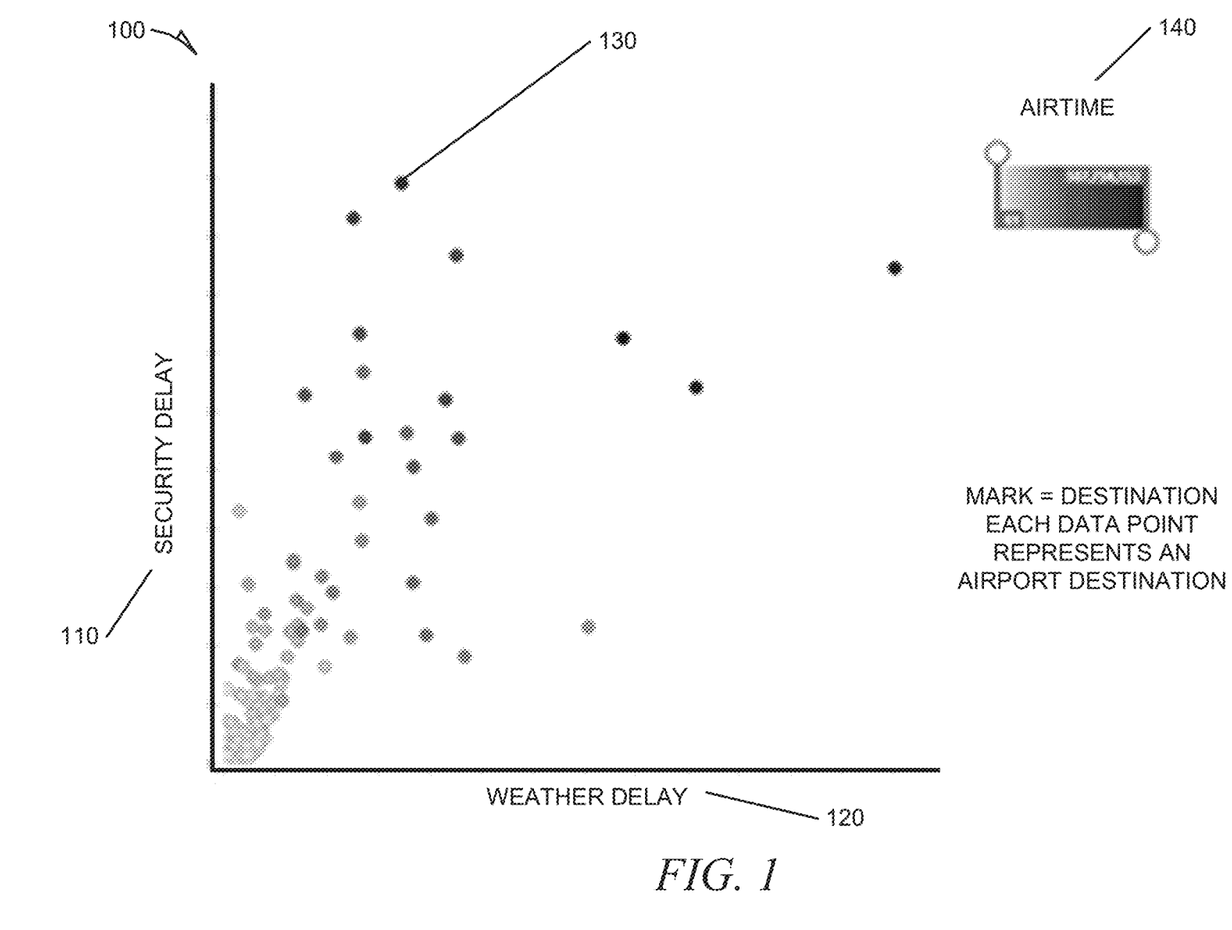
FIG. 1 is a visualization, according to an example embodiment, of data subsets including non-random structures.

FIG. 1 includes a visualization 100 generated according to an example embodiment for enabling an insightful visualization of a dataset. In an example, the multivariate insight discovery approach is used to present insightful visualizations to a user who has little or no experience with a particular data set. In this example, the dataset includes OLAP data. Typically, an OLAP dataset consists of columns that are classified as either measures or attributes (e.g., dimensions), which may be part of a hierarchical structure. In the case of a column classified as a measure, the OLAP data also includes a proposed aggregation method for the measure. An OLAP cube may be considered a generalization of a three-dimensional spreadsheet. For example, a company might wish to summarize financial data by product ID, by time-period, and by location to compare the relevant data in each dimension. Product ID, time, and location comparison are the data's dimensions. Each cell of the cube holds a number that represents some measure of the business, such as sales. The elements of a dimension may be organized as a hierarchy, a set of parent-child relationships, typically where a parent member summarizes or includes its children. Furthermore, parent elements may be aggregated as the children of another parent element of the OLAP data. For example, a monthly report may be the child of a quarterly report which is in turn the child of a yearly report, etc.

Before going into the details of the visualization guidelines that may be used to produce visualization 100, some concepts and their relation to the example visualizations herein are now described:

x-axis/y-axis: a measure or an attribute may be associated with an axis.

mark: represents the different values of the dimension associated with each data point that is represented in the visualization. For example, in the discussion of FIG. 1 (below), each mark (i.e., circle) represents a different "destination" data point.

mark type: the type of the data point representation, e.g., bar or dot.

color property: a measure or an attribute may be associated with the color property; different values are represented by different colors.

size property: the value of the measure associated with the size property determines the size of the mark, e.g., dot size.

row/column: this feature may be used to create a trellis chart.

visualization type: how the data points are displayed with respect to each other, e.g., comparison, stack, spread, scatter, group.

With these concepts in mind, an example set of visualization guidelines for displaying a subset of a dataset and highlighting the statistical insights found by analyzing the dataset, particularly with respect to FIG. 1.

In the example of FIG. 1, the visualization 100 is generated (after consulting appropriate visualization guidelines) for a set of columns comprising an attribute and three measures (i.e., $AM_1M_2M_3$). The visualization type is "scatter" and the visualization 100 makes use of a mark 130 (circle) to represent each data point in the attribute "destination"; in this case each data point represents a location, e.g., airports. The visualization 100 of FIG. 1 also makes use of a color property to represent the measure "average 'Air Time' of each flight arriving at each destination" by coloring each mark 130 darker as the average flight time for airplanes arriving at the destination increases. The "Air Time" legend 140 indicates the functioning of the color property. It should be noted that a size property might also be used, for example, each mark 130 may be shown as larger or smaller depending on the volume of aircraft passing through the airport location each day. Furthermore, the measure "security delay" 110 is shown along the y-axis and the measure "weather delay" is shown along the x-axis.

Since a dataset may be hard to interpret for an unfamiliar user, the goal is to automatically identify subsets of the measures and attributes of the OLAP data that result in insightful visualizations for the viewing user. In the context of this patent document, a visualization may be considered insightful or interesting if the data included in the visualization has a non-random structure. For example, a user may access a large volume of data regarding delays and flight times from airports at multiple locations and find it impossible to make any meaningful observations regarding the dataset. However, according to example methods and systems described herein, a visualization 100 of airplane flight data, as illustrated in FIG. 1, may allow the user to see that the airport security delays 110 (y-axis) are clearly correlated with the weather delays 120 (x-axis) in a non-random structure or pattern. Furthermore, a user may also see that the color property (flight time) is also correlated with the delays as is evident from the darker colors as the delays increase. These relationships might be difficult to identify from a large set of non-visual data.

In order to identify subsets of the dataset that may result in insightful visualizations (i.e., include a non-random structure), different types of statistical analysis methods may be applied to the same level of aggregation of the OLAP data as the one that will be shown in the visualization. The visualization of these subsets may be used to communicate insightful information to a viewing user by employing the tailored set of visualization selection guidelines according to the embodiments described herein.

Example Operating Environment

Figure 2:
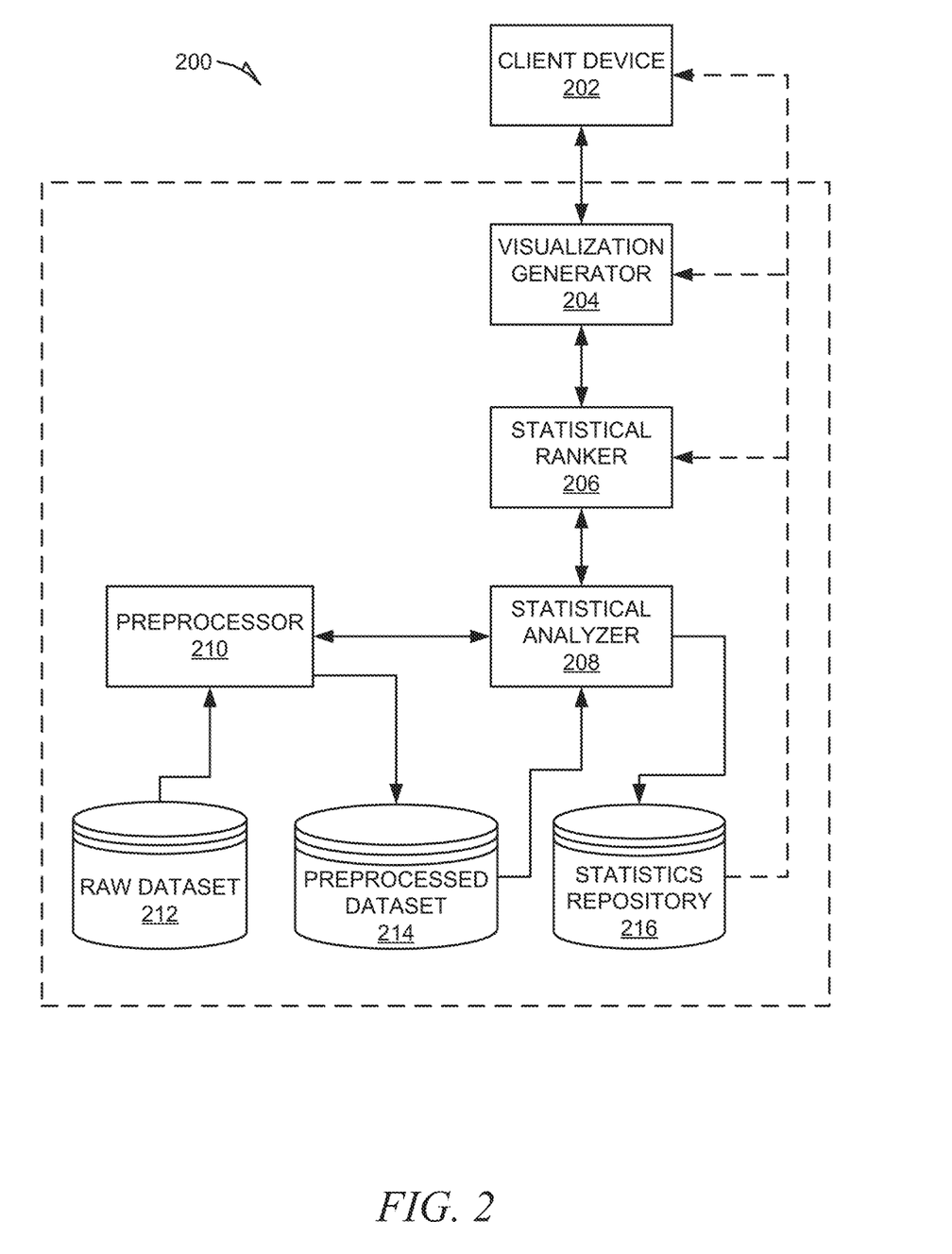
FIG. 2 is a block diagram illustrating a hardware environment and data flow generating visualizations, according to an example embodiment.

FIG. 2 is a block diagram illustrating an environment 200 for operating a visualization generator 204, according to an example embodiment. The environment 200 is an example environment within which methods for implementing insightful visualizations of datasets may be performed for a raw dataset 212. The environment 200 may include a client device 202 (e.g., processing device such as a desktop computer, laptop, tablet or smartphone), and elements of a system for processing and visualizing datasets. The elements may include a visualization generator 204, a statistical ranker 206, a statistical analyzer 208, a preprocessor 210, and data stored in containers (e.g., databases). The data includes a raw dataset 212, a preprocessed dataset 214, and a statistics repository 216. It will be appreciated that although the elements are shown individually, any of the individual elements may be combined into a single element for performing the functions of each of the combined elements.

The client device 202 may have multiple applications installed on it, including an application for processing data from datasets. A user of client device 202 may desire or need to review or process a large raw dataset 212. In order to make sense of the large amount of data in raw dataset 212, which includes OLAP data in this example, a user of client device 202 (who may not even be familiar with the type of data) may request that a visualization generator 204 assist the user in understanding the data in raw dataset 212. The visualization generator 204 may then request that the statistical ranker 206 provide it with a specified number of smaller subsets of the raw dataset 212 according to a score associated with each subset via which the subsets may be ranked for the presence of non-random structures. The statistical ranker 206 may then request that the statistical analyzer 208 provide it with the results of a statistical analysis of the raw dataset 212. The statistical analyzer 208 may then request that the preprocessor 210 process raw dataset 212 to generate a preprocessed dataset 214, such that applying at least one specified type of statistical analysis to this preprocessed dataset 214 and applying the same type of statistical analysis to the original raw dataset 212 yields the same results. The at least one specified type of statistical analysis may include, for example, the correlation coefficient for measuring linear dependency. The preprocessing may be accomplished, for example, by discarding unusable data and duplicate data. The preprocessing may include a data modeling component (e.g., type and hierarchy identification) if the data in the raw dataset 212 database has not already been modeled. Furthermore, the preprocessing may also include column selection and aggregation.

In an example, the preprocessing may provide, for each measure of the raw dataset 212, discarding the measure based on more than half of the values of the measure being one of not-applicable ("NA"), zero or otherwise unusable.

In an example, the preprocessing may provide for aggregating over at least one attribute of the raw dataset 212; for example: aggregating over attributes of the raw dataset 212 containing 99% of the same value, aggregating over attributes of the raw dataset 212 with a cardinality greater than a threshold value, aggregating over all of the attributes of the raw dataset 212 in order of decreasing cardinality until a dataset has a threshold size, and based on the aggregation type of an attribute of the raw dataset 212 being "Average", storing the "Sum" and "Count" values for corresponding measures of the attribute.

In an example, the preprocessing may include data modeling such as for example: determining hierarchical relationships between the attributes of the raw dataset 212; determining equivalencies between the attributes and between the measures of the raw dataset 212; for equivalent attributes of the raw dataset 212, discarding all but one of the equivalent attributes; and for equivalent measures of the raw dataset 212, discarding all but one of the equivalent measures.

The preprocessed dataset (preprocessed dataset 214) may then be provided to the statistical analyzer 208 and/or be placed (e.g., cached) into the preprocessed dataset 214 database for storage.

The statistical analyzer 208 may then work directly on the preprocessed dataset 214 for analysis of the data to find subsets of data exhibiting non-random patterns. The statistical analyzer 208 may also store any statistical results of the analysis of the preprocessed dataset 214 in the statistics repository 216, e.g., a database. The statistics repository 216 may be directly accessed by the statistical ranker 206, whose output is received by the visualization generator 204 and possibly by other clients, such as client device 202.

In an example, the statistical analyzer 208 may analyze the preprocessed dataset 214 to identify at least one subset of the preprocessed dataset 214 that includes a non-random structure by performing an analysis that includes the at least one specified statistical analysis, for example, the correlation coefficient.

In an example, the statistical analyzer 208 may analyze only the subsets of columns in the preprocessed dataset 214 that consist of an attribute A and a measure M and the subsets that consist of two attributes $A_1$ and $A_2$ and a measure M.

In an example, the statistical analyzer 208 may analyze the preprocessed dataset 214 based on the at least one statistical analysis which includes an analysis of variance (ANOVA) test, a statistical model that analyzes the differences between group means.

The statistical analyzer 208 may generate a score for each subset based, for example, on the "effect size" of ANOVA for the subset then provide the statistical ranker 206 with a group of identified subsets of preprocessed dataset 214 (e.g., AM or $A_1A_2M$) together with the scores generated for each identified subset of the group.

The statistical ranker 206 may then rank the group of subsets for insightfulness and/or interestingness (e.g., presence of non-random data structures) based on the score generated for each respective subset and provide the visualization generator 204 with a specified number of ranked subsets for the generation of insightful or interesting visualizations for the user of client device 202.

The visualizations produced by visualization generator 204 may include at least one of: a mark representing the different values of an attribute, a mark type for each type of data point representation, a mark color property associated with a measure or an attribute, a mark size property associated with the value of a measure, x-axis, y-axis, rows, columns and a visualization type that determines how the data points are displayed in relation to each other.

In an example, the visualization generator 204 may determine which attribute, from a received data subset of preprocessed dataset 214, to use with a color property of the visualization based on attribute hierarchies.

In an example, the visualization generator 204 may select a mark type, for example bar or dot, based on the cardinality of the at least one attribute included in the subset of preprocessed dataset 214 that is being visualised.

In an example, the visualization generator 204 may select which attribute, from a received data subset of preprocessed dataset 214, to use for the color property based on determining that an attribute is one of included as a mark and included on an x-axis with a cardinality less than 10 and/or determining that an attribute is at a higher hierarchy level than an attribute used as a mark with a cardinality less than 10.

Example Data Modeling

If the raw dataset 212 has not been modeled, an example embodiment includes a data modeling phase, where attribute hierarchies may be mapped and sets of equivalent attributes and measures identified.

First, the attributes of raw dataset 212 may be ordered based on their cardinality. For each combination of two attributes the following query may be run:

SELECT D, D*, count(*)
FROM OLAP_CUBE
GROUP BY D, D*

If a hierarchical relationship is identified, then the relationship may be inserted into the attribute hierarchy map, see for example Table 1. In this example D is considered an ancestor of D* since it includes or summarizes D*.

TABLE 1

| Hierarchical Relationship between D and D* | | |
|---|---|---|
| D | D* | Count(*) |
| A1 | X1 | 30 |
| A1 | X2 | 50 |
| A2 | X3 | 100 |
| A2 | X4 | 200 |
| A2 | X5 | 300 |

If a one-to-one relationship is identified between dimensions, then example embodiments may select one of the dimensions and discard the remaining dimensions (that have been identified as being in a one-to-one relationship with the selected dimension) since they may be considered as equivalent dimensions to the selected dimension. See for example Table 2.

TABLE 2

One-to-one Relationship between D and D*

| D | D* | Count(*) |
|---|----|----------|
| A1 | X1 | 30 |
| A2 | X2 | 100 |

One-to-one or hierarchical relationships do not need to be 100% exact. If the result is in within a certain range (e.g. 95-100%), the dimensions may be still considered to be dependent.

Next, the algorithm identifies equivalent measures. For all pairs of measures, it calculates their correlation coefficient. In an example, if their correlation coefficient is greater than a user-defined threshold (typically this threshold is around 0.95), these measures may be considered as equivalent measures. Similarly to the dimension case, only one of the equivalent measures may be kept and the others discarded. In an example, the statistical analysis may be restricted to the remaining measures and dimensions.

When calculating the aggregated values of a measure, the following cases need to be distinguished based on the specified aggregation type:

Let $M=m_1, \ldots m_n$ be the raw data and agg an aggregation function. Let $M_1 \approx (m_1, \ldots m_i), \ldots M_m \approx (m_j, \ldots m_n)$ be subsets of M, such that $M_1 \cap \ldots M_m = \emptyset$ and $M_1 \cup \ldots M_m = M$. Then:

$Min(m_1, \ldots m_n) = Min(Min(M_1), \ldots Min(M_m))$
$Max(m_1, \ldots m_n) = Max(Max(M_1), Max(M_m))$
$Count(m_1, \ldots m_n) = Count(M_1) + \ldots Count(M_m)$
$Sum(m_1, \ldots m_n) = Sum(M_1) + \ldots Sum(M_m)$
$Avg(m_1, \ldots m_n) = (Sum(M_1) + \ldots Sum(M_m))/(Count(M_1) + \ldots Count(M_m))$ It will, of course, be appreciated that other aggregation types that have similar behaviour may be processed in a similar manner.

Since for some aggregation types, such as the ones mentioned above, the aggregated values may be correctly calculated based on the values in the preprocessed dataset 214, the statistical analysis by statistical analyzer 208 does not require access the original raw dataset 212 (for these aggregation types).

Example Impact of Aggregation

Figure 3A:
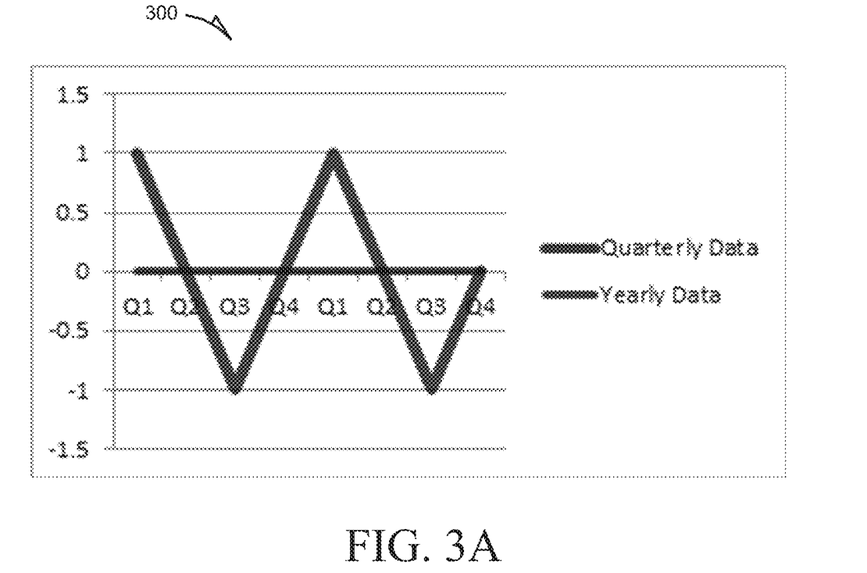
FIGS. 3A and 3B illustrate the disappearance and appearance of patterns in data as a result of aggregation, according to an example embodiment.

FIG. 3A includes a graph 300 illustrating an example of how aggregation of OLAP data may change the patterns or structures that are visible in data. This can be important because patterns can both disappear or appear based on aggregation. For example, in graph 300 the pattern that is clearly visible in the quarterly (i.e., raw) data disappears when aggregating over the attribute "Quarter" to obtain yearly data. The yearly data does not show any pattern.

Figure 3B:
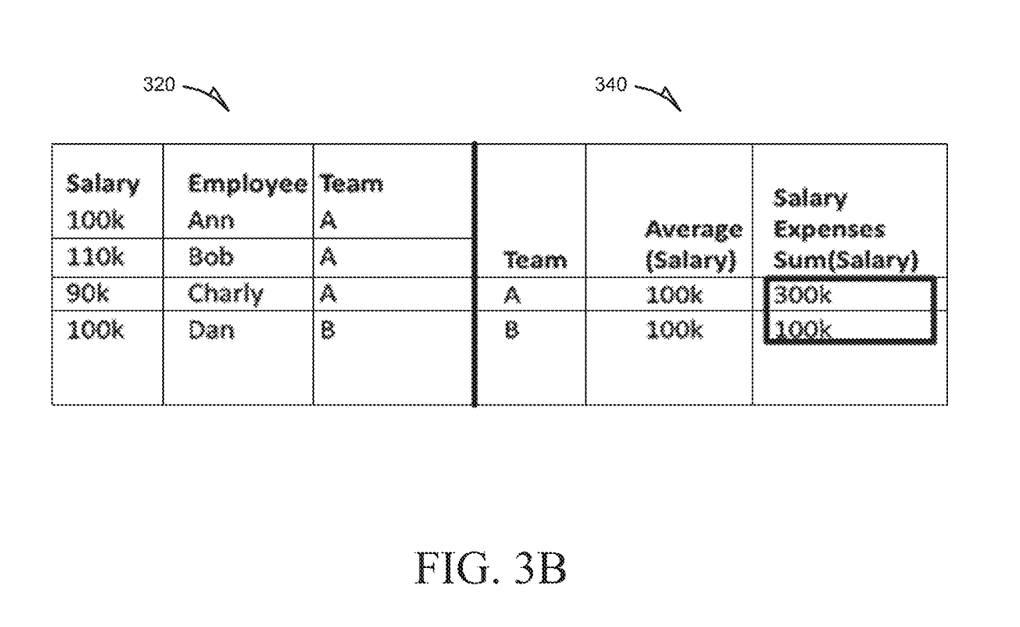

FIG. 3B includes two side-by-side tables 320 and 340 illustrating an example of how aggregation of OLAP data may change the patterns or structures that are visible in data. In table 320, there is very little variance in the values of the measure "Salary" across the attribute "Employees". However, when aggregating over the attribute "Team" in table 340, using the aggregator "sum" on the measure "Salary", the values are quite different for each team. As may be seen in table 340, no team member's salary varies by more than 20% and yet the aggregate salaries of team A and team B differ by 200%. Because of the impact that aggregation may have on the patterns that may be visible (i.e., the non-random patterns that may be identified), the statistical analysis may be run on the level of aggregation that will be presented to the user.

Example Visualization Guidelines

Figure 4:
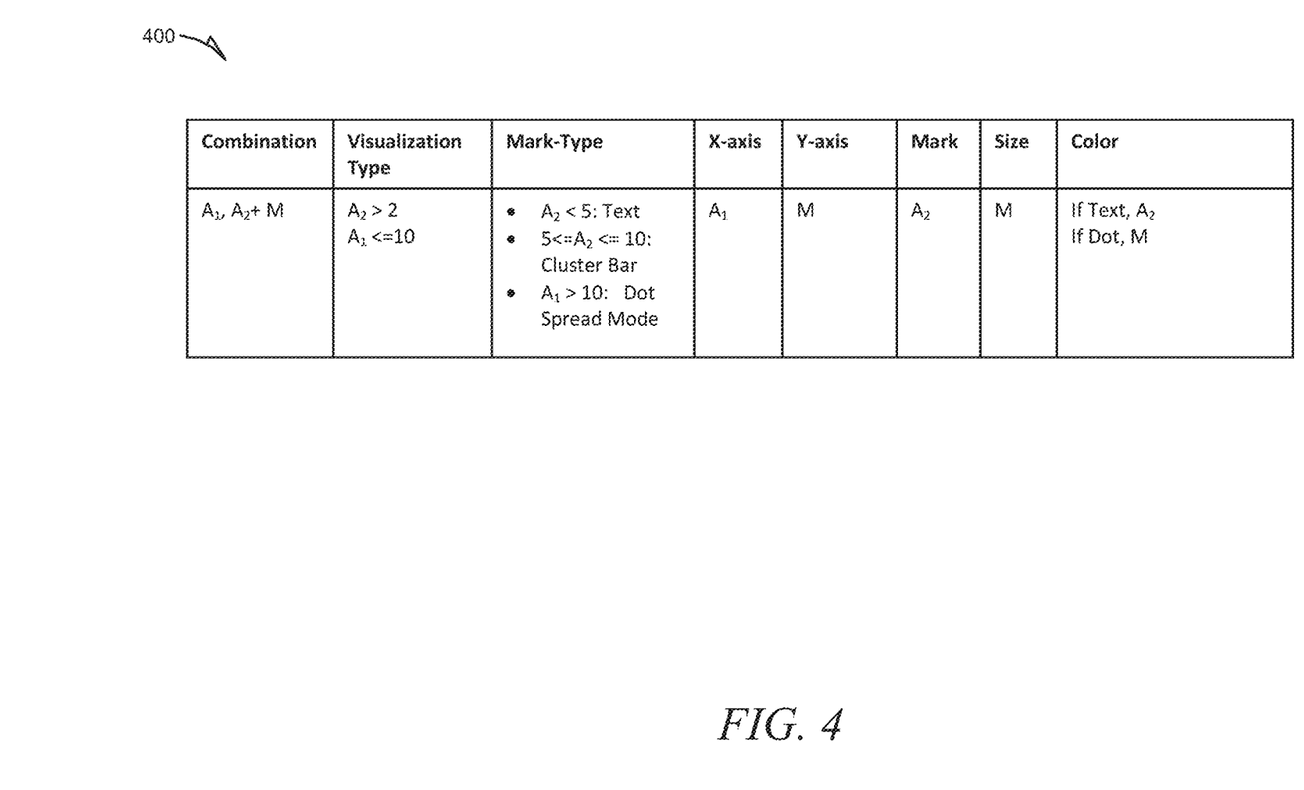
FIG. 4 includes a table illustrating visualization guidelines, according to an example embodiment.

FIG. 4 includes a table 400 illustrating example visualization guidelines that may be used in accordance with the systems and methods presented herein. For example, in table 400 visualization guidelines for a subset include two attributes $A_1$ and $A_2$ and a measure M.

As can be seen in table 400, the x-axis is used for attribute $A_1$, the y-axis is used for measure M, and the attribute $A_2$ is used for the "mark".

In an example, choosing a mark type is dependent on the cardinality of the attributes included in the visualization. For example, in FIG. 4 it is specified that if $A_2$ is less than 5 than the mark type should be "Text".

In an example, the mark type may be considered when choosing an attribute or measure for the color property of the visualization. This can be seen in table 400 which provides that attribute $A_2$ should be used with the color property if the mark type is "Text", i.e., "If Text, $A_2$".

In an example, columns may be used with the color property only if they are attribute columns with cardinality less than 10. Therefore attribute data may be considered when choosing an attribute for the color property. For example, if an attribute is included as the "mark" and has cardinality less than 10, then this attribute may be considered for the color property. If these conditions (i.e. attribute is mark and has cardinality <10) are not present, then if an attribute on the x-axis has cardinality less than 10, this attribute should be chosen for the color property. If these conditions (i.e. attribute is mark and has cardinality <10) are not present, then the visualization guidelines include searching up the attribute hierarchy of the attribute used as the "mark", until an attribute is reached with cardinality less than 10; this attribute should then be chosen for the color property. If these conditions are not present, then the visualization guidelines don't suggest color in the visualization.

In an example, the type of visualization (e.g., comparison, stack, spread, group) may be based on the cardinality of attributes. For example, if $A_2>2$ then visualization type 1 (e.g., spread) or if $A_1 \leq 10$ then visualization type 2.

In an example, the subset data may be sorted based on the value of the measure included in visualization, e.g., M in table 400.

Example Limitation of Search Space

Figure 5:
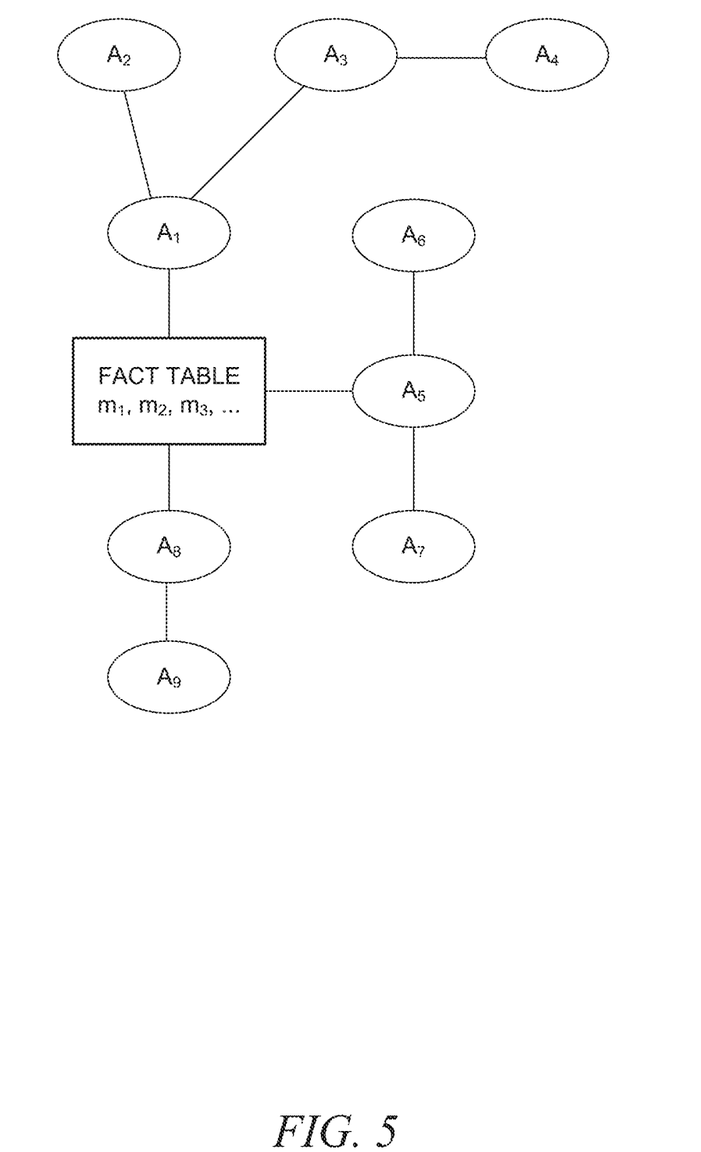
FIG. 5 illustrates attribute hierarchies of "online analytical processing" (OLAP) data determined according to an example embodiment.

FIG. 5 illustrates an example mapping of the hierarchies of a particular OLAP dataset for the purpose of limiting the search space of the statistical analysis described herein. As mentioned above, the search space of the statistical analyzer 208 may, for example, be restricted to only certain subsets of columns contained in the preprocessed dataset 214. For example the statistical analyzer 208 may analyze the subsets of columns that consist of an attribute A and a measure M and the subsets that consist of two attributes $A_1$ and $A_2$ and a measure M. In this example, the attribute hierarchies may be used to limit the data search space for statistical analysis. The $a_i$-$a_j$ attribute combinations may be restricted as follows: once the first attribute, $a_i$, is fixed, the second, is selected from the list of attributes, while ignoring the children of $a_i$. Accordingly, in the example of FIG. 5, if $a_i=A_3$, then $A_4$ should not be chosen for a subset combination. Furthermore, in the example of FIG. 5, if $a_i=A_1$, then $A_2$, $A_3$ and $A_4$ should not be chosen for a subset combination.

This is beneficial since the data in the children is included in and summarized by the parent and may therefore be duplicative or not provide an interesting visualization. Since statistical analysis often requires a set of values of at least a specified size, the above-noted combination selection criteria may be used to the most appropriate attributes. For example, one of the assumptions of the ANOVA test is that there are at least five data points for each value of $a_i$, and therefore the above-noted strategy helps in reducing the search space by leaving out combinations that aren't fulfilling the assumptions of ANOVA.

Example Statistical Analysis and Ranking

In an example, and as mentioned above, the search space of the statistical analyzer 208 is restricted to certain subsets of columns contained in the preprocessed dataset 214, which includes measures and dimensions. However since the values of measures may be calculated accurately based on the aggregated data, the statistical analyzer 208 does not require access to the original raw dataset 212. This also reduces the runtime since the amount of data being analyzed may be much less than the amount of data in the original raw dataset 212.

In an example, he statistical analyzer 208 may perform different types of statistical tests on the preprocessed dataset 214 including, for example, ANOVA (Analysis of variance), a statistical model that analyzes the differences between group means, and Shapiro-Wilk, a statistical test to test for normality based on the cardinality of an attribute.

In an example, and for the purpose of the following pseudo code, the following four variable names are created:

$A_{2-10}$: includes attributes with cardinality between 2 and 10.

$A_{5-10}$: includes attributes with cardinality between 5 and 10.

$A_{10-25}$: includes attributes with cardinality between 10 and 25.

$A_{>25}$: includes attributes with cardinality>25 in increasing order.

In an example, the following pseudo code for using ANOVA may be used to generate the attribute-attribute-measure combinations for a subset of preprocessed dataset 214 including two attributes and a measure. The assumptions for ANOVA include a significance level as input and, typically, this level has a value between 0.05 and 0.01. The significance level may also be adjusted to guarantee a certain result size.

Pseudo Code for Run-Time Optimization for A-A-M Combinations:

```
double significanceLevel;
For (a_i in A_{2-10})
    For (a_j in (A_{10-25} ∪ A_{5-10} ∪ A_{>25})) // order is important!
        If (a_i <> a_j & a_j is not ancestor of a_i) // see Table 1 above for
ancestor example
            For (m in Measures) //order of measures should be random
                Run ANOVA on the following data:
                    SELECT a_i, agg(m)
                    FROM Preprocessed DataSet
                    GROUP BY a_i, a_j
                If (p-value < significanceLevel)
                    Include (a_i, a_j, m) in resultList
                    If(optimizeRunTime)
                        break
```

Assumptions: ANOVA assumes that there are at least five data points for each value in $a_i$.

In an example, the results are ranked based on their effect size, which is one of the statistics that is a result of ANOVA.

In an example, the following pseudo code is for using the Shapiro-Wilk statistical test to generate the attribute-attribute-measure combinations for a subset of preprocessed dataset 214 including two attributes and a measure.

Pseudo Code for A-M Combinations:

```
double significanceLevel;
For (a in A> 25)
    For (m in Measures) //measures in random order
        Run Shapiro-Wilk for
            SELECT a, agg(m)
            FROM Preprocessed DataSet
            GROUP BY a
        If (p-value < significanceLevel)
            Include a-m combination in ResultSet
```

Runtime Improvement Strategy:
If (the p-values of the first six Shapiro-Wilk tests for a are <significanceLevel")
Stop and rank results for a first visualization scenario (e.g., spread);
Else use a second visualization scenario (e.g., group).

Example Ranking of Results

Attribute-measure combinations may be ranked by the statistical ranker 206 based on the following score that is based on the skew and excess kurtosis of the underlying data:

EffectSize=normalizedSkew+normalizedKurtosis.

normalizedSkew:=divide skew values by standard deviation; and take absolute value.

normalizedKurtosis:=divide positive skew values by their standard deviation; divide negative skew values by their standard deviation; and take absolute value.

Of course, other scoring functions may also be used in addition to the above or as an alternative.

Combining Results:
If the algorithm returns more than one a-m combination for an attribute a, then up to three a-m, a-m' combinations may be provided to the visualization generator 204 in order of their ranking.

Example Methods

Further methods will be described below; in particular the methods will be described in relation to the previously described figures and elements.

Figure 6:
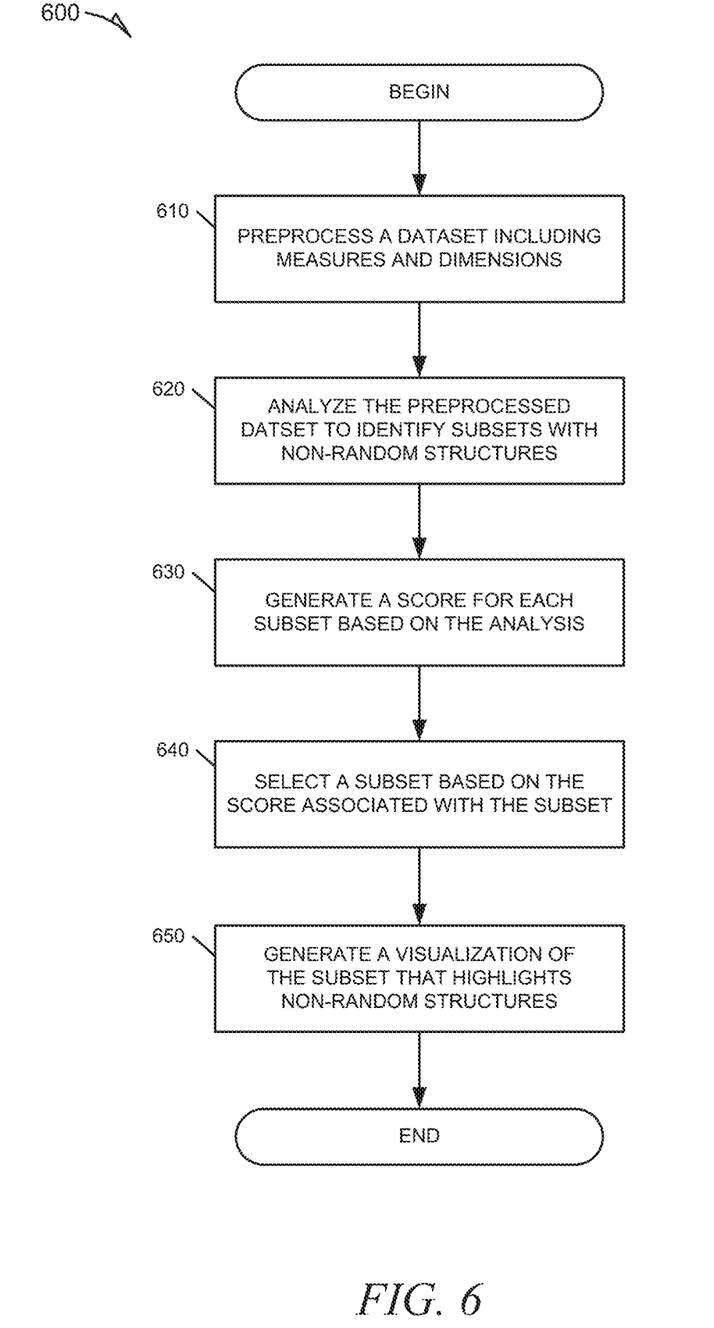
FIG. 6 is a flowchart illustrating a method, according to an example embodiment, for generating a visualization of a dataset identified as including a non-random structure.

FIG. 6 is a flowchart illustrating a method 600 for visualizing the data in a dataset, according to an example embodiment. In an example, the method 600 may include operations for: receiving a dataset and generating a preprocessed dataset from the dataset at operation 610, identifying subsets of the preprocessed dataset that include non-random structure at operation 620; generating a score for each subset at operation 630; selecting a subset based on its associated score at operation 640; and generating a visualization of the selected subset at operation 650.

In an example, the method 600 may begin at operation 610 with the raw dataset 212 being accessed by a preprocessor 210 which processes the raw dataset to generate a preprocessed dataset 214 from the raw dataset 212. The processing includes applying at least one algorithm to the raw dataset 212 to produce preprocessed dataset 214 such that at least one specified type of statistical analysis produces the same results when applied to each of the datasets 212 and 214. In certain examples, the preprocessor 210 may discard useless data and/or duplicative data to generate the preprocessed dataset 214.

At operation 620, the method 600 may continue with the statistical analyzer 208 analyzing the preprocessed dataset 214 based, at least in part, on the at least one specified type of statistical analysis, in order to identify subsets of the preprocessed dataset 214 that include data that exhibits non-random patterns. For example, the data of the preprocessed dataset 214 may be subjected to an ANOVA or Shapiro-Wilk analysis in order to identify potentially interesting subsets of the preprocessed dataset 214. At operation 630, the method 600 may continue with the statistical analyzer 208 generating a score for each subset of the preprocessed dataset 214 based on the analysis of the preprocessed dataset 214. In certain examples, this may be based on the "effect size" of each subset. At operation 640, the statistical ranker 206 may rank the subsets according to their associated score and forward a specified number of the highest scoring subsets to the visualization generator 204 for display. Finally, at operation 650, the method 600 may include the visualization generator 204 generating a visualization for each received subset where each visualization highlights the non-random patterns in the data of each of the subsets being visualized. In certain examples this may include using color or size to emphasize the identified patterns that will be presented to the user.

Figure 7:
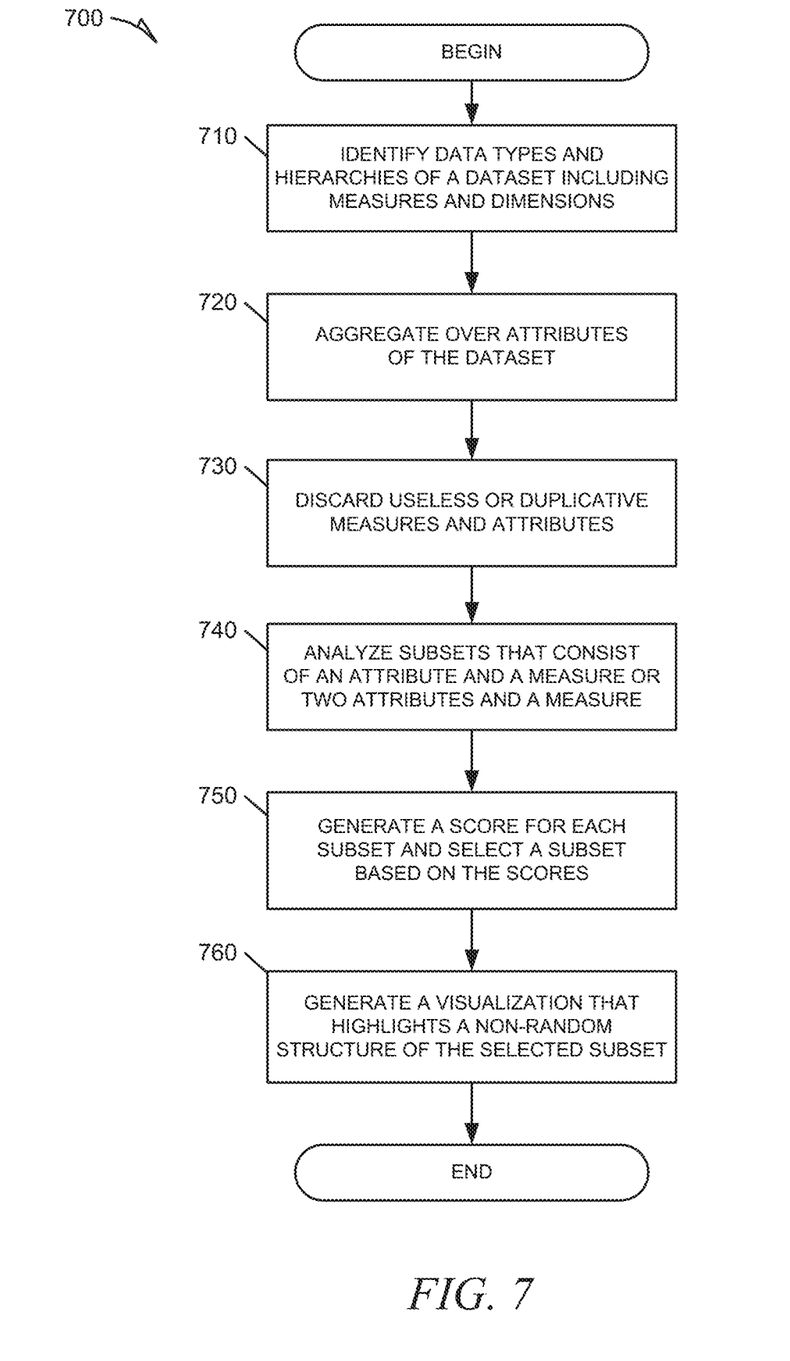
FIG. 7 is a flowchart illustrating a method, according to an example embodiment, for generating a visualization of a dataset identified as including a non-random structure.

FIG. 7 is a flowchart illustrating a method 700 for visualizing the data in a dataset, according to an example embodiment. In an example, the method 700 may include operations for: identifying data types and hierarchies of a dataset including measures and dimensions at operation 710; aggregating over attributes of the dataset at operation 720; discarding useless or duplicative measures and attributes at operation 730; analyzing only certain subsets of the preprocessed dataset at operation 740; generating a score for each subset and selecting a subset of the preprocessed dataset based on this score at operation 750; and generating a visualization that highlights the non-random structure of the selected subset at operation 760.

In an example, the method 700 may begin at operation 710 with the raw dataset 212, which includes measures and dimensions (e.g., OLAP data or table data) being accessed by a preprocessor 210 which identifies data types of the raw dataset and models the data of the raw dataset 212, e.g., to determine hierarchies. The preprocessor 210, at operation 720, aggregates over selected attributes of the raw dataset 212. At operation 730, the method 700 continues with the preprocessor 210 discarding any useless data (e.g., with a zero value) and/or duplicative data (e.g., equivalent dimensions of the cube) of the raw dataset 212 to generate the preprocessed dataset 214. At operation 740, the method 700 may continue with the statistical analyzer 208 analyzing preprocessed dataset 214 by analyzing only those subsets of the preprocessed dataset 214 consisting of an attribute and a measure and those subsets consisting of two attributes and a measure. For example, the data of the preprocessed dataset 214 may be subjected to an ANOVA or Shapiro-Wilk analysis in order to identify potentially interesting subsets of the preprocessed dataset 214. At operation 750, the method 700 may continue with the statistical analyzer 208 generating a score for each subset of the preprocessed dataset 214 based on the analysis of the preprocessed dataset 214. At operation 760, the statistical ranker 206 may rank each subset based on its associated score and select a specified number of subsets, based on their ranking, to forward to the visualization generator 204 for display in a manner highlights the non-random patterns in the data of each of the subsets being visualized.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may operate to support performance of the relevant operations in a "cloud computing" environment or as a "software as a service" (SaaS). Some of the operations may be performed by a group of computers (e.g., machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry (e.g., a FPGA or an ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures deployed, in example embodiments.

Example Architecture and Machine-Readable Medium

Figure 8:
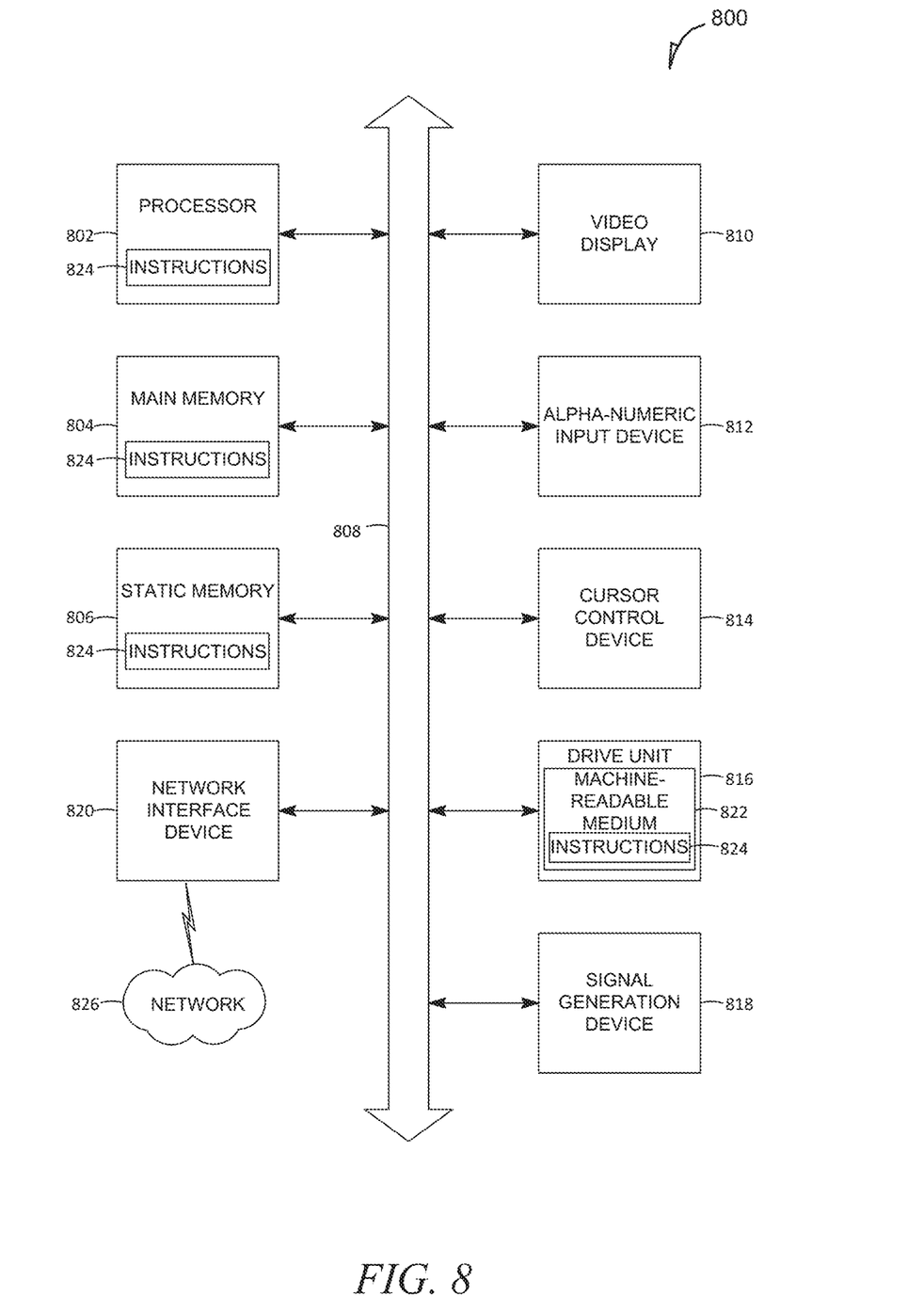
FIG. 8 is a diagrammatic representation of a machine in the example form of a computer system within which a set of instructions for causing the machine to perform any one or more of the methodologies discussed herein may be executed.

FIG. 8 is a block diagram of a machine in the example form of a computer system 800 within which instructions 824 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal displays (LCD) or a cathode ray tube (CRT)). The computer system 800 also includes an alphanumeric input device 812 (e.g., a keyboard), a cursor control (user interface (UI) navigation) device 814 (e.g., a mouse), a disk drive unit 816, a signal generation device 818 (e.g., a speaker) and a network interface device 820.

Machine-readable Medium

The disk drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, static memory 806, and/or within the processor 802 during execution thereof by the computer system 800, with the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions (e.g., instructions 824) for execution by the machine and that cause the machine to perform any one or more of the methodologies disclosed herein, or that is capable of storing, encoding or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although the present disclosure includes references to specific example embodiments, it will be evident that various modifications and changes may be made to these embodiments without departing from the broader spirit and scope of the present disclosure. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
    generating, by the at least one processor, a reduced dataset from a raw dataset by:
        mapping, by the at least one processor, attribute hierarchies of the raw dataset to identify sets of equivalent attributes and measures;
        for each set of equivalent attributes, selecting, by the at least one processor, one of the equivalent attributes and discarding the remaining equivalent attributes; and
        for each set of equivalent measures, selecting, by the at least one processor, one of the equivalent measures and discarding the remaining equivalent measures;
    aggregating over at least one attribute of the reduced dataset to generate a preprocessed dataset with the same relevant statistical properties of the raw dataset, such that at least one type of statistical analysis produces the same results when applied to the preprocessed dataset as when applied to the raw dataset;
    identifying, by the at least one processor, at least one subset of the preprocessed dataset that includes data that exhibits non-random patterns by performing at least one type of statistical analysis; and
    generating, by the at least one processor, a visualization that highlights a non-random structure of the at least one subset of the reduced dataset.

2. The method of claim 1, wherein before generating the reduced dataset, the method comprises:
    identifying data types of a raw dataset and models of data of the raw dataset to determine attribute hierarchies.

3. The method of claim 1, wherein the preprocessed dataset includes at least one online analytical processing (OLAP) cube and generating the preprocessed dataset further comprises:
  discarding a measure of the raw dataset based on more than half of the values of the measure being zero;
  determining hierarchical relationships between attributes of the raw dataset; and
  storing "Sum" and "Count" values for corresponding measures of an attribute based on an aggregation type of the attribute being "Average".

4. The method of claim 3, wherein generating the preprocessed dataset includes at least one of:
  aggregating over attributes of the raw dataset containing 99% of the same value;
  aggregating over attributes of the raw dataset with a cardinality greater than a threshold value; or
  aggregating over all of the attributes of the raw dataset in order of decreasing cardinality until the dataset has a threshold size.

5. The method of claim 1, wherein the at least one type of statistical analysis includes an analysis of variance (ANOVA) test, and the method further comprises:
  analyzing only subsets of the preprocessed dataset that consist of an attribute and a measure and subsets that consist of two attributes and a measure; and
  generating a score for each identified subset is based on an effect size of ANOVA for the identified subset.

6. The method of claim 1, wherein the visualization includes at least one of:
  a mark representing different values of an attribute, a mark type for each type of data point representation, a mark color property associated with a measure or an attribute, or a mark size property associated with a value of a measure, and the method further comprises:
  selecting an attribute of the selected identified subset for the color property based on attribute hierarchies; and
  selecting a mark type based on a cardinality of an attribute of the selected identified subset.

7. The method of claim 6, wherein the selecting an attribute for the color property based on the attribute hierarchies includes one of:
  determining that an attribute is one of included as a mark and included on an x-axis with a cardinality less than 10; or
  determining that an attribute is at a higher hierarchy level than an attribute used as a mark with a cardinality less than 10.

8. The method of claim 1, wherein mapping the attribute hierarchies of the raw dataset to identify sets of equivalent attributes comprises generating an attribute hierarchy map comprising identified hierarchical relationships between attributes.

9. The method of claim 1, wherein identifying sets of equivalent measures comprises calculating a correlation coefficient for each of a plurality of pairs of measures and determining whether the calculated coefficient for each pair of measures is greater than a predefined threshold to be considered as equivalent measures.

10. A system comprising:
  a memory that stores instructions; and
  one or more processors configured by the instructions to perform operations comprising:
    generating a reduced dataset from a raw dataset by:
      mapping attribute hierarchies of the raw dataset to identify sets of equivalent attributes and measures;
      for each set of equivalent attributes, selecting one of the equivalent attributes and discarding the remaining equivalent attributes; and
      for each set of equivalent measures, selecting one of the equivalent measures and discarding the remaining equivalent measures;
    aggregating over at least one attribute of the reduced dataset to generate a preprocessed dataset with the same relevant statistical properties of the raw dataset, such that at least one type of statistical analysis produces the same results when applied to the preprocessed dataset as when applied to the raw dataset;
    identifying at least one subset of the preprocessed dataset that includes data that exhibits non-random patterns by performing at least one type of statistical analysis; and
    generating a visualization that highlights a non-random structure of the at least one subset of the reduced dataset.

11. The system of claim 10, wherein before generating reduced dataset, the operations comprise:
  identifying data types of a raw dataset and models of data of the raw dataset to determine attribute hierarchies.

12. The system of claim 10, wherein the preprocessed dataset includes at least one online analytical processing (OLAP) cube and generating the preprocessed dataset further comprises:
  discarding a measure of the raw dataset based on more than half of the values of the measure being zero;
  determining hierarchical relationships between attributes of the raw dataset; and
  storing "Sum" and "Count" values for corresponding measures of an attribute based on an aggregation type of the attribute being "Average".

13. The system of claim 12, wherein generating the preprocessed dataset includes at least one of:
  aggregating over attributes of the raw dataset containing 99% of the same value;
  aggregating over attributes of the raw dataset with a cardinality greater than a threshold value; or
  aggregating over all of the attributes of the raw dataset in order of decreasing cardinality until the dataset has a threshold size.

14. The system of claim 10, wherein the at least one type of statistical analysis includes an analysis of variance (ANOVA) test, and the operations further comprise:
  analyzing only subsets of the preprocessed dataset that consist of an attribute and a measure and subsets that consist of two attributes and a measure; and
  generating a score for each identified subset is based on an effect size of ANOVA for the identified subset.

15. The system of claim 10, wherein the visualization includes at least one of:
  a mark representing different values of an attribute, a mark type for each type of data point representation, a mark color property associated with a measure or an attribute, or a mark size property associated with a value of a measure, and the operations further comprise:
  selecting an attribute of the selected identified subset for the color property based on attribute hierarchies; and
  selecting a mark type based on a cardinality of an attribute of the selected identified subset.

16. The system of claim 15, wherein the selecting an attribute for the color property based on the attribute hierarchies includes one of:

determining that an attribute is one of included as a mark and included on an x-axis with a cardinality less than 10; or determining that an attribute is at a higher hierarchy level an an attribute used as a mark with a cardinality less than 10.

17. The system of claim 10, wherein mapping the attribute hierarchies of the raw dataset to identify sets of equivalent attributes comprises generating an attribute hierarchy map comprising identified hierarchical relationships between attributes.

18. The system of claim 10, wherein identifying sets of equivalent measures comprises calculating a correlation coefficient for each of a plurality of pairs of measures and determining whether the calculated coefficient for each pair of measures is greater than a predefined threshold to be considered as equivalent measures.

19. A non-transitory machine-readable storage medium including instructions that, when executed on at least one processor of a machine, cause the machine to perform operations comprising:

generating a reduced dataset from a raw dataset by:
mapping attribute hierarchies of the raw dataset to identify sets of equivalent attributes and measures;
for each set of equivalent attributes, selecting one of the equivalent attributes and discarding the remaining equivalent attributes; and
for each set of equivalent measures, selecting one of the equivalent measures and discarding the remaining equivalent measures;

aggregating over at least one attribute of the reduced dataset to generate a preprocessed dataset with the same relevant statistical properties of the raw dataset, such that at least one type of statistical analysis produces the same results when applied to the preprocessed dataset as when applied to the raw dataset;

identifying at least one subset of the preprocessed dataset that includes data that exhibits non-random patterns by performing at least one type of statistical analysis; and generating a visualization that highlights a non-random structure of the at least one subset of the reduced dataset.

20. The machine-readable storage medium of claim 19, wherein before generating the reduced dataset, the operations comprise:

identifying data types of a raw dataset and models of data of the raw dataset to determine attribute hierarchies.

\* \* \* \* \*